Jan. 8, 1963    F. L. HAUSHALTER    3,071,851
METHOD OF MAKING A COMPOSITE ASSEMBLY FOR USE BETWEEN
CONCENTRIC SECTIONS OF A TORSIONAL SHAFT
Filed Aug. 18, 1960
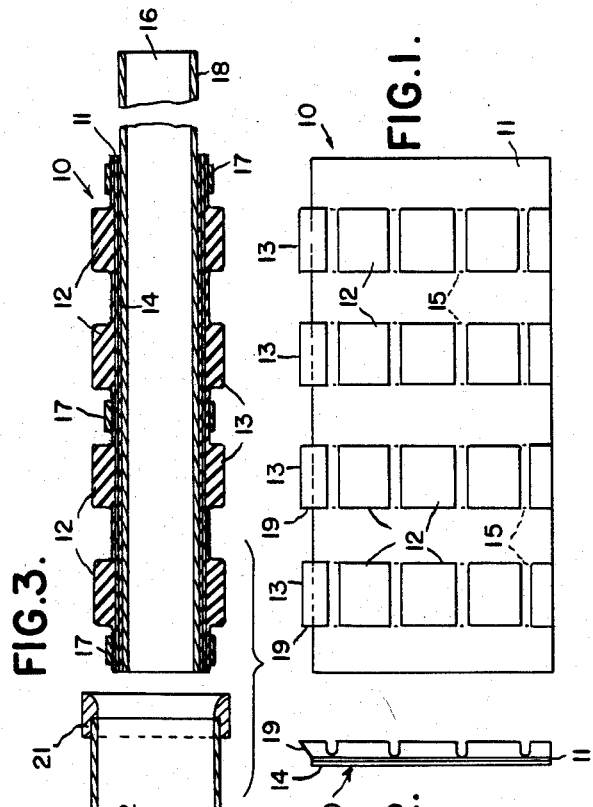
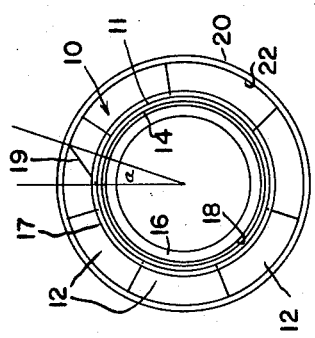
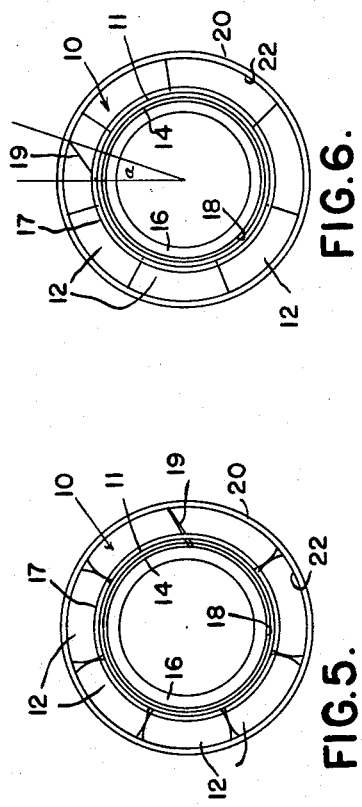
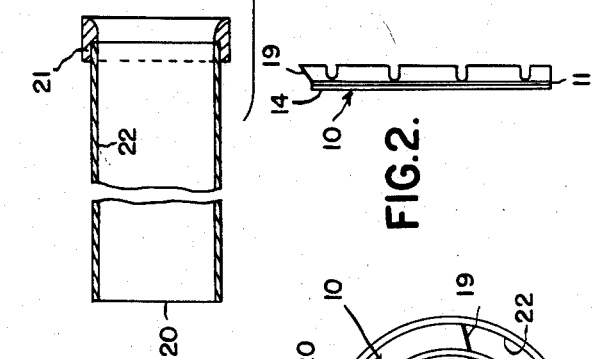
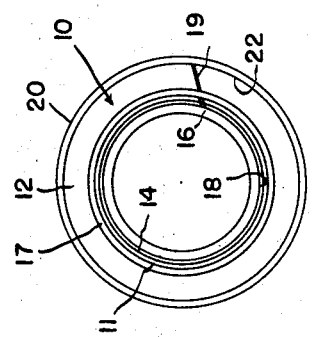
INVENTOR.
FRED L. HAUSHALTER
BY
*Whittemore, Hulbert & Belknap*
ATTORNEYS United States Patent Office 3,071,851
Patented Jan. 8, 1963

3,071,851
METHOD OF MAKING A COMPOSITE ASSEMBLY FOR USE BETWEEN CONCENTRIC SECTIONS OF A TORSIONAL SHAFT
Fred L. Haushalter, 2185 Scott Lake Road, Pontiac, Mich.
Filed Aug. 18, 1960, Ser. No. 50,449
4 Claims. (Cl. 29—451)

This invention relates generally to a composite assembly for use between concentric sections of a torsional shaft and method of making the same, and refers more particularly to a composite assembly disposed within the annular space between the opposed concentric cylindrical surfaces of the spaced apart, relatively rotatable, inner and outer members or sections of the torsional shaft.

One of the essential objects of the invention is to provide a composite assembly for use between concentric sections of a torsional shaft wherein the composite assembly is preformed before being assembled with the inner and outer shaft sections.

Another object is to provide a method of making a torsional shaft having a composite rubber-metal assembly in the space between the inner and outer shaft sections, wherein the composite assembly is formed flat, rolled to tubular shape, secured to the inner shaft section as by bands, and then the inner shaft section and composite assembly are inserted within the outer shaft section to compress the rubber.

Another object is to provide a composite assembly for use between concentric sections of a torsional shaft wherein the assembly is so formed that it may be quickly and easily assembled with the shaft sections.

Another object is to provide a composite assembly which includes a metal sheet or strip having relatively thick slabs or strips of elastic material bonded to one surface and a relatively thin coating of elastic material bonded to the opposite surface.

Another object is to provide a composite assembly which serves as the sole means for effecting a yieldable connection between the relatively rotatable inner and outer members of the torsional shaft.

Another object is to provide a composite assembly wherein the combined overall cross-sectional thickness of the metal strip and elastic material bonded to opposite surfaces thereof is greater than the radial width of the annular space between the relatively rotatable inner and outer members, whereby the elastic material is under compression between the inner and outer members.

Other objects, advantages, and novel details of construction of this invention will be made more apparent as this description proceeds, especially when considered with the accompanying drawings, wherein:

FIGURE 1 is a plan view of the initial form of a composite assembly or insert, before assembly with the sections of the torsional shaft.

FIGURE 2 is an edge view of the insert shown in FIGURE 1.

FIGURE 3 is a longitudinal sectional view of a torsional shaft, in an intermediate stage of assembly, having the insert of FIGURES 1 and 2 secured to the inner member.

FIGURE 4 is an end view of the torsional shaft of FIGURE 3, after assembly, having a composite assembly or insert provided with continuous strips of rubber, shown on an enlarged scale.

FIGURE 5 is an end view similar to FIGURE 4, having a composite assembly or insert provided with spaced rows of individual slabs of rubber.

FIGURE 6 is a view like FIGURE 5, with the inner and outer members relatively rotated through a small angle.

In FIGURES 1 and 2 it will be seen that the insert 10 initially comprises a flat rectangular metal sheet 11, preferably steel, to one side of which are bonded a plurality of shaped resilient elements or slabs 12 formed from rubber or other curable elastomer. The slabs are arranged in parallel rows 13 and the slabs in each row are spaced apart. These slabs are securely bonded to the metal sheet by curing the elements to the sheet. By bonding the rubber to a thin flat steel sheet, the pressure of vulcanization is at right angles to the plane of the metal, or directly down on the metal, so that a good bond is obtained. A relatively thin coating 14 of elastic material such as rubber is bonded to the opposite surface of the sheet 11. The coating may be sprayed on, or it may be a sheet of rubber bonded to the metal by curing directly thereto, and it covers the entire surface.

While the elastic elements are shown as in the form of slabs, it is contemplated that under certain conditions it may be desirable to provide continuous strips of rubber on the metal strip in place of the individual slabs, as indicated by dotted lines at 15.

There will be a thin film of rubber over the metal between the strips or slabs 12. However, this is incidental and is the result of flow from the strips or slabs during curing. This rubber film can be seen in FIG. 3.

After the rubber strips or slabs and coating have been bonded to the flat metal sheet, the combined rubber and metal insert is bent to circular form about the inner tube 16, and metal bands 17 are applied about the insert in the circumferentially extending spaces between the rows of slabs by a conventional banding machine. The bands may for example be in the form of metal strips the opposite ends of which are crimped together or to a coupling sleeve. The insert is thus removably secured to the tube 16 with the coating 14 on its inner surface in frictional contact with the outer cylindrical surface 18 thereof to prevent slip and with the opposite longitudinal edges thereof close together or actually butting. It will be seen in FIGS. 1 and 2 that the edges of the slabs or strips along one longitudinal edge of the metal sheet are beveled at 19 and extend beyond the sheet, whereas the edges of the slabs or strips along the opposite longitudinal edge are flush therewith. This is to close the gap between the slabs or strips which otherwise would develop when the insert is bent to circular form. FIGS. 4 and 5 show the gap substantially closed, the insert being formed of strips in one instance and slabs in the other.

The tube 16 with the insert secured thereto is then inserted into the outer tube 20 through a reducing die 21. The die is funnel-shaped to compress the rubber gradually, and has an enlarged counter-bored portion removably fitting over the end of outer tube 20. In the final assembled position, the inner tube and the insert secured thereto are inserted to an extent such that the entire insert is compressed between the tubes. The outer cylindrical surface 18 of the inner tube and the inner cylindrical surface 22 of the outer tube are concentric, when assembled, and define an annular space which is of less radial width than the combined cross-sectional thickness of the rubber elements, metal sheet and coating making up the insert. Accordingly, the wall of the rubber strips or slabs 12 will be compressed about 40% of their original height in section when the assembly is completed. The bands secure the insert to the inner tube tightly enough so that a sufficiently strong frictional contact between the coating 14 and inner tube exists during insertion to resist slip. This frictional contact is increased when the insert is compressed between the tubes, so that no slip will result after assembly. The coating may be relatively thin since its primary purpose is to prevent slip.

The tubes 16 and 20 make up the concentric sections of a torsional shaft, such as the propeller shaft of a motor vehicle.

Referring to FIG. 4, when the inner and outer tubes are relatively rotated, the rubber of the continuous strips 12 is twisted or placed in torsion. The torsional rate in inch-lbs. per degree is substantially constant; that is, the number of degrees of relative rotation of the tubes is nearly directly proportional to the torque in inch-lbs., so that a plot of torque against angle of rotation is substantially a straight line. Referring to FIGURES 5 and 6, a different situation exists where the rubber elements are in the form of individual slabs. The compressed rubber slabs in each row are spaced so that they barely touch, under conditions of no torque. When one tube is rotated relative to the other, the torsional rate will be substantially constant through a small angle. However, when rotated through the angle "a," the gap between the slabs closes and the torsional rate will increase markedly, that is the shaft assembly will stiffen up and any additional torque will produce a relatively small rotation as compared to the rotation it would produce below the angle "a."

The stiffened torsion rate achieved by the slab type insert after a specified angle provides a safety factor when overload is applied to the torsional shaft which might cause slippage of the rubber on the inner tube or induce undesirable vibrations in the shaft assembly. At the same time this insert will provide a relatively low torsional rate at normal loads. If desired, a suitable lubricant may be applied to the rubber elements to facilitate insertion of the inner tube.

What I claim as my invention is:

1. The method of making a torsion unit having spaced apart inner and outer relatively rotatable members provided with opposed cylindrical surfaces concentric with the axis of rotation of said members, and having a yieldable connection between said rotatable members disposed within the annular space between said opposed cylindrical surfaces; comprising the steps of providing a relatively thin, flat, straight, flexible metal strip having free ends, vulcanizing relatively thick spaced rubber slabs on one surface of said flat strip in a row extending from one end of said strip to the other and vulcanizing a relatively thin rubber layer on the opposite surface of said flat strip to form a composite unit having a cross-sectional thickness in the free state of the rubber substantially greater than the radial width of the annular space between the opposed cylindrical surfaces of said rotatable members, bending said composite unit in the arc of a circle so that the opposite free ends of said strip are positioned adjacent each other in confronting relation and said slabs are on the outside of the arc to provide a substantially annular structure in which the rubber is prestressed and said slabs are in circumferentially spaced relation to each other and project radially outwardly from said strip, positioning and maintaining said substantially annular structure about said inner member in encircling concentric relation therewith, and then forcing said inner member and encircling substantially annular structure endwise into said outer member in concentric relation therewith, whereby the rubber of said slabs is axially stretched and tensioned and flows circumferentially into the spaces between said slabs and said substantially annular structure is placed between and in concentric relation with said opposed cylindrical surfaces with said rubber slabs radially compressed and in tight frictional engagement with the cylindrical surface of said outer member and said rubber layer in tight frictional engagement with the cylindrical surface of said inner member.

2. The method of making a torsion unit having spaced apart inner and outer relatively rotatable members provided with opposed cylindrical surfaces concentric with the axis of rotation of said members, and having a yieldable connection between said rotatable members disposed within the annular space between said opposed cylindrical surfaces; comprising the steps of providing a relatively thin, flat, straight, flexible metal strip having free ends, vulcanizing relatively thick rubber slabs on one surface of said flat strip in a plurality of rows extending from one end of said strip to the other in laterally spaced relation with the slabs in each row spaced from each other and vulcanizing a relatively thin rubber layer on the opposite surface of said flat strip to form a composite unit having a cross-sectional thickness in the free state of the rubber substantially greater than the radial width of the annular space between the opposed cylindrical surfaces of said rotatable members, bending said composite unit in the arc of a circle so that the opposite free ends of said strip are positioned adjacent each other in confronting relation and said slabs are on the outside of the arc to provide a substantially annular structure in which the rubber is prestressed and the slabs in each row are in circumferentially spaced relation to each other and project radially outwardly from said strip, positioning and maintaining said substantially annular structure about said inner member in encircling concentric relation therewith, and then forcing said inner member and encircling substantially annular structure endwise into said outer member in concentric relation therewith, whereby the rubber of said slabs is axially stretched and tensioned and flows circumferentially into the spaces between said slabs and said substantially annular structure is placed between and in concentric relation with said opposed cylindrical surfaces with said rubber slabs radially compressed and in tight frictional engagement with the said cylindrical surface of said outer member and said rubber layer in tight frictional engagement with the cylindrical surface of said inner member.

3. The method defined in claim 2, wherein the rubber layer completely covers the said opposite surface of said strip.

4. The method defined in claim 2, wherein said substantially annular structure is secured to said inner member by the application of a band about said substantially annular structure in the space between adjacent rows of slabs prior to the insertion of said inner member and encircling substantially annular structure into said outer member.

References Cited in the file of this patent

UNITED STATES PATENTS

| | | |
|---|---|---|
| 2,008,772 | Robertson | July 23, 1935 |
| 2,110,783 | Welker | Mar. 8, 1938 |
| 2,361,139 | White et al. | Oct. 24, 1944 |
| 2,426,132 | Williams | Aug. 19, 1947 |
| 2,647,556 | Courtney | Aug. 4, 1953 |
| 2,723,706 | Carter | Nov. 15, 1955 |
| 2,763,055 | Hardy | Sept. 18, 1956 |
| 2,795,036 | Haushalter | June 11, 1957 |
| 2,949,021 | Charlesworth | Aug. 16, 1960 |